(12) United States Patent
Niu et al.

(10) Patent No.: US 11,700,662 B2
(45) Date of Patent: Jul. 11, 2023

(54) APPARATUS AND METHOD FOR MOBILITY MANAGEMENT

(71) Applicant: ZTE Corporation, Guangdong (CN)

(72) Inventors: Li Niu, Guangdong (CN); Yajun Zhao, Guangdong (CN)

(73) Assignee: ZTE Corporation, Guangdong (CN)

( * ) Notice: Subject to any disclaimer, the term of this patent is extended or adjusted under 35 U.S.C. 154(b) by 11 days.

(21) Appl. No.: 17/075,048

(22) Filed: Oct. 20, 2020

(65) Prior Publication Data

US 2021/0037591 A1    Feb. 4, 2021

Related U.S. Application Data

(63) Continuation of application No. PCT/CN2018/083890, filed on Apr. 20, 2018.

(51) Int. Cl.
*H04W 76/19* (2018.01)
*H04W 36/08* (2009.01)
(Continued)

(52) U.S. Cl.
CPC .......... *H04W 76/19* (2018.02); *H04L 5/0055* (2013.01); *H04W 28/06* (2013.01); *H04W 36/08* (2013.01);
(Continued)

(58) Field of Classification Search
CPC ..... H04W 76/19; H04W 28/06; H04W 36/02; H04W 36/08; H04W 80/08; H04W 72/0446; H04W 72/23; H04L 5/0055
See application file for complete search history.

(56) References Cited

U.S. PATENT DOCUMENTS

| | | | | |
|---|---|---|---|---|
| 2010/0111065 A1* | 5/2010 | Noh | ...................... | H04B 7/0691 370/342 |
| 2014/0295820 A1* | 10/2014 | Kim | .................. | H04W 52/0225 455/418 |

(Continued)

FOREIGN PATENT DOCUMENTS

| | | |
|---|---|---|
| CN | 201444640 U | 4/2010 |
| CN | 102123517 A | 7/2011 |

(Continued)

OTHER PUBLICATIONS

International Search Report and Written Opinion dated Jan. 15, 2019 for International Application No. PCT/CN2018/083890, filed on Apr. 20, 2018 (14 pages).

(Continued)

*Primary Examiner* — Un C Cho
*Assistant Examiner* — Lalita W Pace
(74) *Attorney, Agent, or Firm* — Perkins Coie LLP

(57) ABSTRACT

Methods, systems, and devices related to mobility management (e.g., reducing transmission delay and interference, and/or increasing transmission reliability) using the unlicensed spectrum are described. In one representative aspect, a method for wireless communication includes receiving, at a wireless communication node, a first message from a mobile device requesting a reestablishment of a network connection; transmitting, from the wireless communication node, a second message to the mobile device, the second message including information for reestablishing and reconfiguring the network connection; and receiving, at the wireless communication node, a third message from the mobile device acknowledging at least one of (1) completing a reestablishment of the network connection, or (2) completing a reconfiguration of the network connection.

20 Claims, 14 Drawing Sheets

(51) Int. Cl.
  *H04L 5/00* (2006.01)
  *H04W 28/06* (2009.01)
  *H04W 72/0446* (2023.01)
  *H04W 80/08* (2009.01)
  *H04W 72/23* (2023.01)
(52) U.S. Cl.
  CPC ....... *H04W 72/0446* (2013.01); *H04W 72/23* (2023.01); *H04W 80/08* (2013.01)

(56) References Cited

U.S. PATENT DOCUMENTS

| | | | | |
|---|---|---|---|---|
| 2014/0334371 | A1* | 11/2014 | Kim | H04W 36/0088 370/311 |
| 2015/0271729 | A1* | 9/2015 | Sirotkin | H04W 48/00 370/332 |
| 2015/0341835 | A1* | 11/2015 | Bontu | H04W 36/0061 370/331 |
| 2016/0285716 | A1* | 9/2016 | Pelletier | H04L 5/0098 |
| 2017/0006520 | A1* | 1/2017 | Quan | H04W 36/38 |
| 2018/0083688 | A1* | 3/2018 | Agiwal | H04M 3/537 |
| 2018/0160467 | A1 | 6/2018 | Quan et al. | |
| 2018/0368200 | A1* | 12/2018 | Jin | H04L 1/20 |
| 2019/0037468 | A1* | 1/2019 | Bongaarts | H04W 36/32 |
| 2019/0116536 | A1* | 4/2019 | Xu | H04W 8/22 |
| 2019/0124572 | A1* | 4/2019 | Park | H04W 36/08 |
| 2021/0360730 | A1* | 11/2021 | Kim | H04W 12/108 |

FOREIGN PATENT DOCUMENTS

| | | | | |
|---|---|---|---|---|
| CN | 102158899 | A | 8/2011 | |
| CN | 102870450 | A | 1/2013 | |
| CN | 106797571 | A | 5/2017 | |
| CN | 107277879 | A | 10/2017 | |
| CN | 103583064 | B * | 1/2018 | ............. H04B 15/00 |
| EP | 3148251 | B1 * | 11/2018 | ........ H04W 36/0011 |
| WO | 2018059557 | A1 | 4/2018 | |

OTHER PUBLICATIONS

Extended European Search Report, EP Appl. No. 18915374.5, dated Nov. 5, 2021, 12 pages.

Huawei, et al. "Consideration on the procedure design for RRC resume and RRC reestablishment," 3GPP TSG-RAN NG2 Meeting #98 Hangzhou, China, May 15-19, 2017, R2-1704869, 4 pages.

ZTE, "Mobility enhancement for NB-IoT UP solution," 3GPP TSG-RAN WG2 Meeting#95bis Kaohsiung, Oct. 10-14, 2016, R2-166073, 7 pages.

ZTE, "Remaining issues on mobility enhancement for NB-IoT UP solution," 3GPP TSG-RAN WG2 Meeting#96 Reno, USA, Nov. 14 -18, 2016, R2-167680, 4 pages.

Office Action for Chinese Application No. 201880091059.2, dated Aug. 30, 2021, 7 pages.

* cited by examiner

… (1)

APPARATUS AND METHOD FOR MOBILITY MANAGEMENT

CROSS REFERENCE TO RELATED APPLICATIONS

This patent document is a continuation of and claims benefit of priority to International Patent Application No. PCT/CN2018/083890, filed on Apr. 20, 2020. The entire content of the before-mentioned patent application is incorporated by reference as part of the disclosure of this application.

TECHNICAL FIELD

This patent document is directed generally to digital wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to mobility management, e.g., reducing transmission delay and interference, and/or increasing transmission reliability, using the unlicensed spectrum.

In one representative aspect, a method for wireless communication is disclosed. The method includes receiving, at a wireless communication node, a first message from a mobile device requesting a reestablishment of a network connection; transmitting, from the wireless communication node, a second message to the mobile device, the second message including information for reestablishing and reconfiguring the network connection; and receiving, at the wireless communication node, a third message from the mobile device acknowledging at least one of (1) completing a reestablishment of the network connection, or (2) completing a reconfiguration of the network connection.

In another representative aspect, a method for wireless communication is disclosed. The method includes transmitting, from a mobile device, a first message to a wireless communication node requesting a reestablishment of a network connection; receiving, at the mobile device, a second message from the wireless communication node, the second message including information for reestablishing and reconfiguring the network connection; and transmitting, from the mobile device, a third message to the wireless communication node acknowledging at least one of (1) completing a reestablishment of the network connection, or (2) completing a reconfiguration of the network connection.

In another representative aspect, a method for wireless communication is disclosed. The method includes transmitting, from a first wireless communication node over a first transmission link, a set of data packets to a mobile device during a handover or a change of node operation; and transmitting, from the first wireless communication node over a second transmission link, at least a subset of the set of data packets to a second wireless communication node during the handover or the change of node operation to cause the second wireless communication to send at least the subset of the set of data packets to the mobile device over a third transmission link.

In another representative aspect, a wireless communication method is disclosed. The method includes receiving, at a mobile device, a set of data packets from a first wireless communication node over a first wireless link during a handover operation or a change of node operation; receiving, at the mobile device, at least a subset of the set of data packets from a second wireless communication node over a second wireless link during the handover operation or the change of node; and decoding the data packets based on the set of data packets from the first wireless communication node and at least the subset of the set of data packets from the second wireless communication node.

In another representative aspect, a wireless communication method is disclosed. The method includes transmitting, from a mobile device, a set of data packets to a first wireless communication node during a handover operation or a change of node; and transmitting, from the mobile device, at least a subset of the set of the data packets to a second wireless communication node during the handover operation or the change of node operation for assisting the first wireless communication node to decode the data packets.

In another representative aspect, a wireless communication method is disclosed. The method includes receiving, at a first wireless communication node, a set of data packets from a mobile device during a handover operation or a change of node operation; receiving, at the first wireless communication node over a second transmission link, at least a subset of the set of data packets from the second wireless communication node; and decoding, by the first wireless communication node, the data packets based on the set of the data packets from the mobile device and at least the subset of the set of data packets from the second wireless communication node.

In another representative aspect, a wireless communication method is disclosed. The method includes monitoring, at a mobile device, a first number of failures of a network activity within a first evaluation period; determining, by the mobile device, based on the first number of failures of the network activity, a network problem caused by a network access using a contention-based protocol; and initiating, by the mobile device, a procedure to recover from the network problem or to report the network problem.

In another representative aspect, a wireless communications apparatus comprising a processor is disclosed. The processor is configured to implement a method described herein.

In yet another representative aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

The amount of user data in the networks is growing rapidly as NR emerges in the wireless market. The rapid growth of the user data leads to a great demand for the spectrum. Currently, the licensed spectrum that is already assigned to network operators is getting to a saturation point. The use of the licensed spectrum also means high operating cost for the network operators. Therefore, more and more network operators are considering using unlicensed spectrum to increase their service offerings. For deployments in selected regions and/or private networks, efficient use of unlicensed spectrum with a wider bandwidth (e.g., 80 or 100 MHz) can reduce implementation complexity for both the network and the terminal as compared to smaller bandwidths. It is thus desirable to consider use scenarios in which high data rates (e.g., multi-giga bytes per second) are used.

In current wireless communication systems, the unlicensed spectrum is simply used as a complementary tool for the licensed spectrum. For example, Licensed-Assisted Access (LAA) was introduced in 3GPP release 13 to combine unlicensed spectrum with the licensed band. Access to the unlicensed spectrum via a Secondary Component Carrier (SCell) is assisted by a Primary Component Carrier (PCell) on the licensed spectrum using the carrier aggregation framework. However, using LAA, the unlicensed spectrum needs to be tied to the licensed spectrum. This limits the deployment and flexible usage of the unlicensed spectrum.

Figure 1:
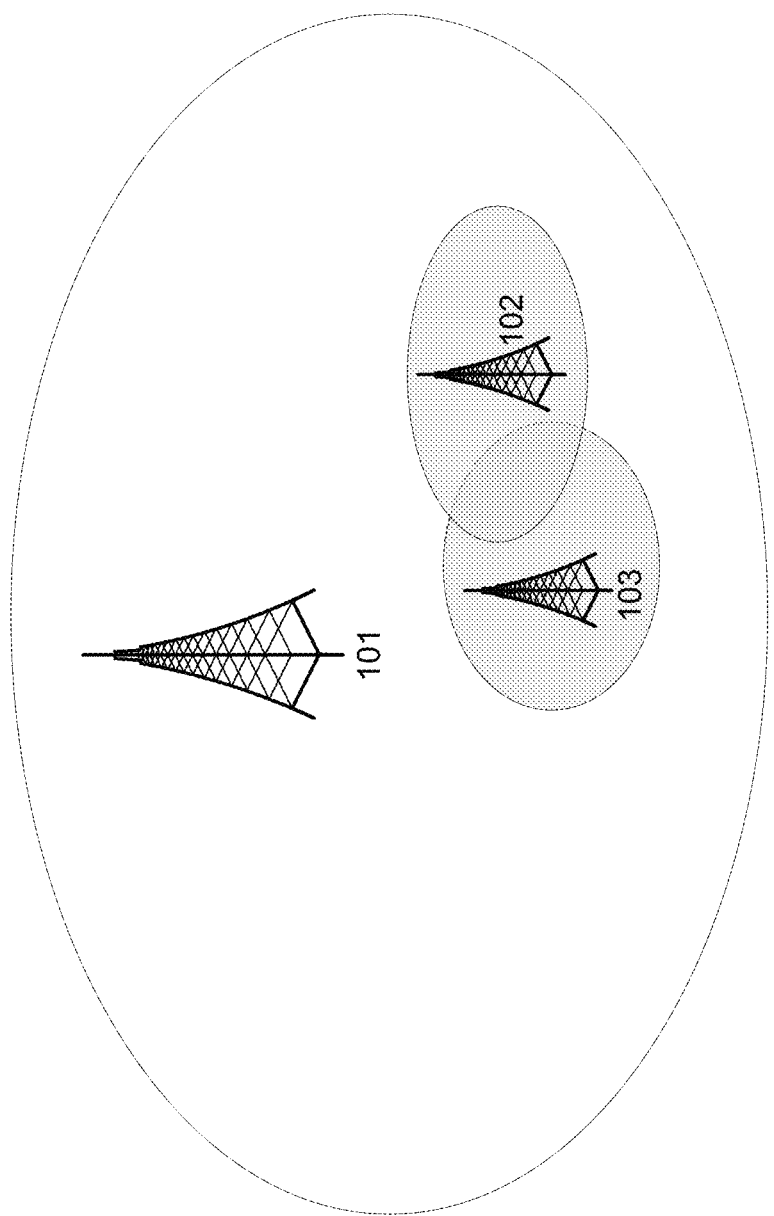
FIG. 1 shows a representative deployment of a licensed and unlicensed spectrum that can be used in New Radio (NR) communication systems.

FIG. 1 shows a representative deployment of licensed and unlicensed spectrum that can be used in the NR communication systems. In FIG. 1, Node A (101) operating in the licensed spectrum can support seamless coverage. Node B (102) and Node C (103) operating in the unlicensed spectrum can be deployed in sub-regions, providing a subset of services or all the services for a terminal (also referred to as a mobile device or a user equipment). The terminal can access Node B or Node C directly. Alternatively, the terminal can access Node A directly as a master node, while Node B and Node C are functioning as secondary nodes.

Unlike in the licensed spectrum, the terminals gain access to the unlicensed spectrum through a contention-based protocol (e.g., "Listen Before Talk" (LBT)). To provide efficient communications using the unlicensed spectrum, different factors (e.g., signal quality, preemption probability, and/or interference level) are evaluated for different use scenarios, including handovers and node changes. Particularly, providing reliable connections and reducing communication delays are important factors to consider for the usage of the unlicensed spectrum.

This document describes techniques that can be implemented in various embodiments to achieve efficient communications using the unlicensed spectrum. The techniques can be used in various scenarios (e.g., connection re-establishment, handovers, and/or change of node) to provide mobile devices with stable connections and to minimize communication issues due to delays. Some examples of the disclosed techniques are described in the following example embodiments.

Example Embodiment 1

Compared with the licensed spectrum, the unlicensed spectrum is more susceptible to interference. In some cases, the contention-based protocol may cause the signals in the unlicensed spectrum to be less reliable. For example, for terminals located at the edge of the cell, the signal quality can be particularly low. Furthermore, the serving cell, the neighboring cells, and the terminals may compete the common spectrum, causing serious interference. Therefore, for the terminals at the edge of a cell, radio link failure and Radio Resource Control (RRC) connection re-establishment procedure happens more frequently.

Figure 2:
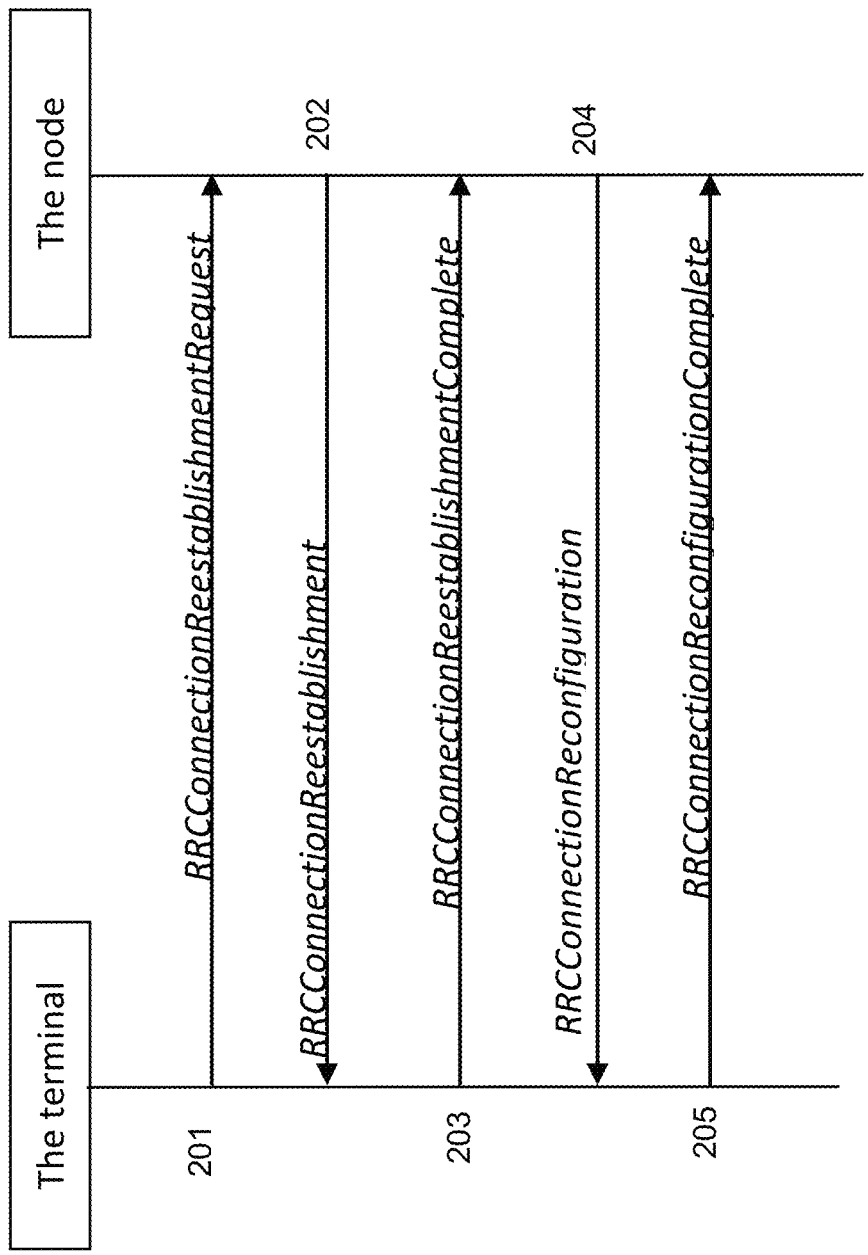
FIG. 2 shows a Radio Resource Control (RRC) connection re-establishment procedure used in some of the current wireless communication systems.

FIG. 2 shows an RRC connection re-establishment procedure used in some of the current wireless communication systems (e.g., Long Term Evolution (LTE) systems). As shown in FIG. 2, five messages are needed to complete this recovery procedure. The terminal first transmits, at 201, an RRCConnectionReestablishmentRequest message to the node. The node transmits, at 202, an RRCConnectionReestablishment message in response to the previous message. The terminal transmits, at 203, an RRCConnectionReestablishmentComplete message to indicate the reestablishment is completed. The node then transmits, at 204, an RRCConnectionReconfiguration message to reconfigure the connection. The terminal transmits, at 205, an RRCConnectionReconfigurationComplete to indicate the reconfiguration has completed.

Because a contention-based protocol (e.g., LBT) is used for unlicensed spectrum, both the terminal and the node need to contend the medium for message transmissions. Thus, the current procedure would lead to five times of medium contention. The recovery procedure can be further delayed when transmission failures happen—retransmissions of messages also require contention-based access. Therefore, the current procedure is not suitable for efficient connection re-establishment in the unlicensed spectrum.

Figure 3:
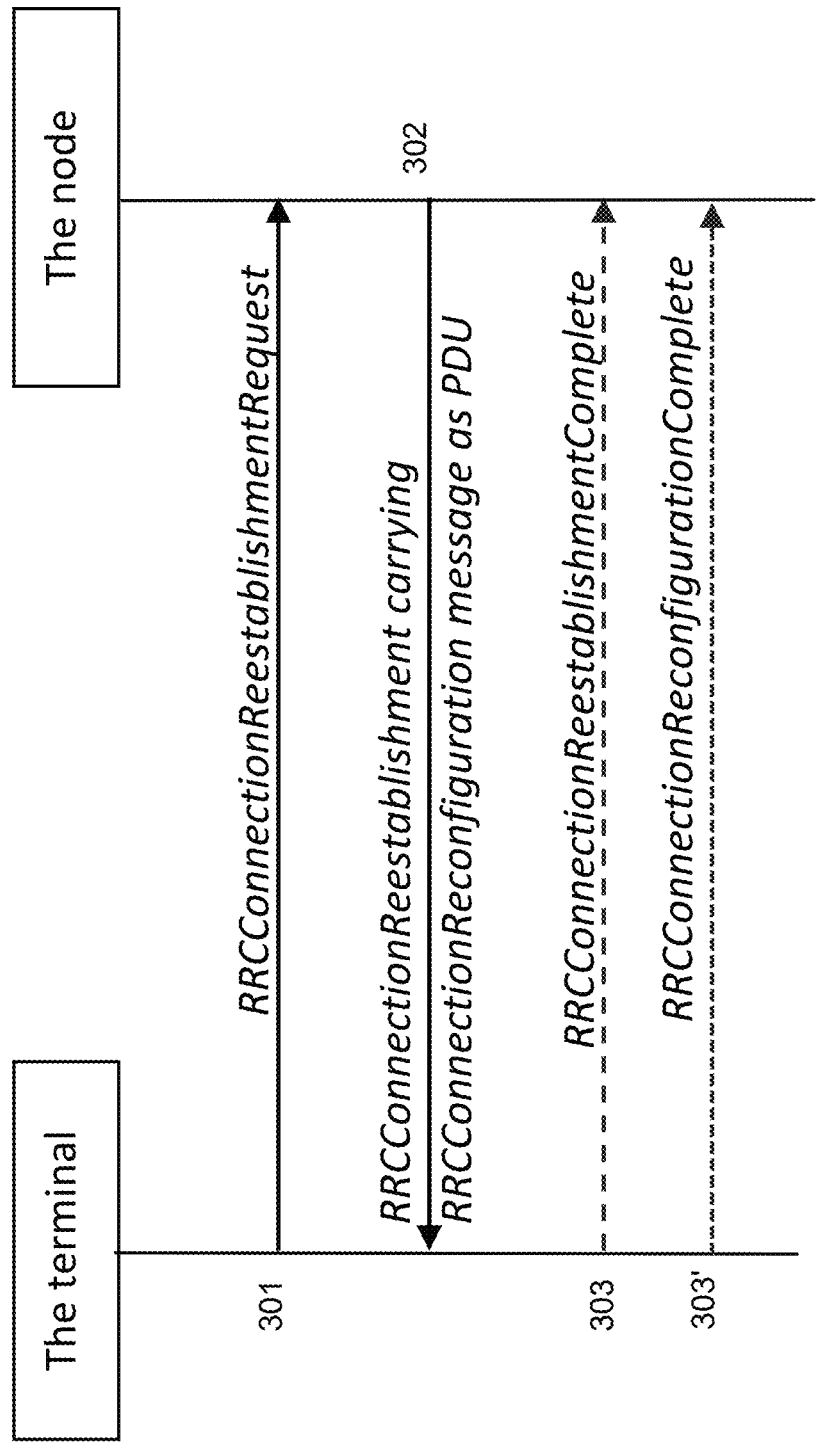
FIG. 3 shows a representative re-establishment procedure in accordance with the disclosed technology.

FIG. 3 shows a representative re-establishment procedure in accordance with the disclosed technology. In this procedure, the terminal first transmits, at 301, an RRCConnectionReestablishmentRequest message to the node. The node then, at 302, transmits a message that includes information for both the RRCConnectionReestablishment and the RRCConnectionReconfiguration. In some embodiment, the RRCConnectionReconfiguration message can be embedded into the RRCConnectionReestablishment message. For example, the RRCConnectionReestablishment message can carry a Protocol Data Unit (PDU) packet or octet string that includes the RRCConnectionReconfiguration message.

If both reestablishment and reconfiguration are successful, the terminal can transmit, at 303 and 303', both the RRCConnectionReestablishmentComplete message and the RRCConnectionReconfigurationComplete message. Alternatively, the terminal can transmit, at 303', a single RRCConnectionReconfigurationComplete message to indicate that both the reestablishment and reconfiguration are successful. If RRC connection reconfiguration fails, the terminal can transmit, at 303, the RRCConnectionReestablishmentComplete message, and/or initiate the connection the re-establishment procedure. If RRC Connection Reestablishment fails, the terminal can perform actions upon leaving the RRC_CONNECTED state.

On the network side, when the node receives the RRCConnectionReconfigurationComplete message, it can determine that both reestablishment and reconfiguration are successful. If it only receives the RRCConnectionReestablishmentComplete message, it can determine that the RRCConnectionReestablishment procedure completes and perform the RRCConnectionReconfiguration procedure again.

Thus, using the improved procedure shown in FIG. 3, the number of message transmission required for the connection recovery process can be reduced to three when both the reestablishment and reconfiguration are successful, thereby reducing the amount of time required to complete the recovery using a contention-based protocol in unlicensed medium.

Figure 4:
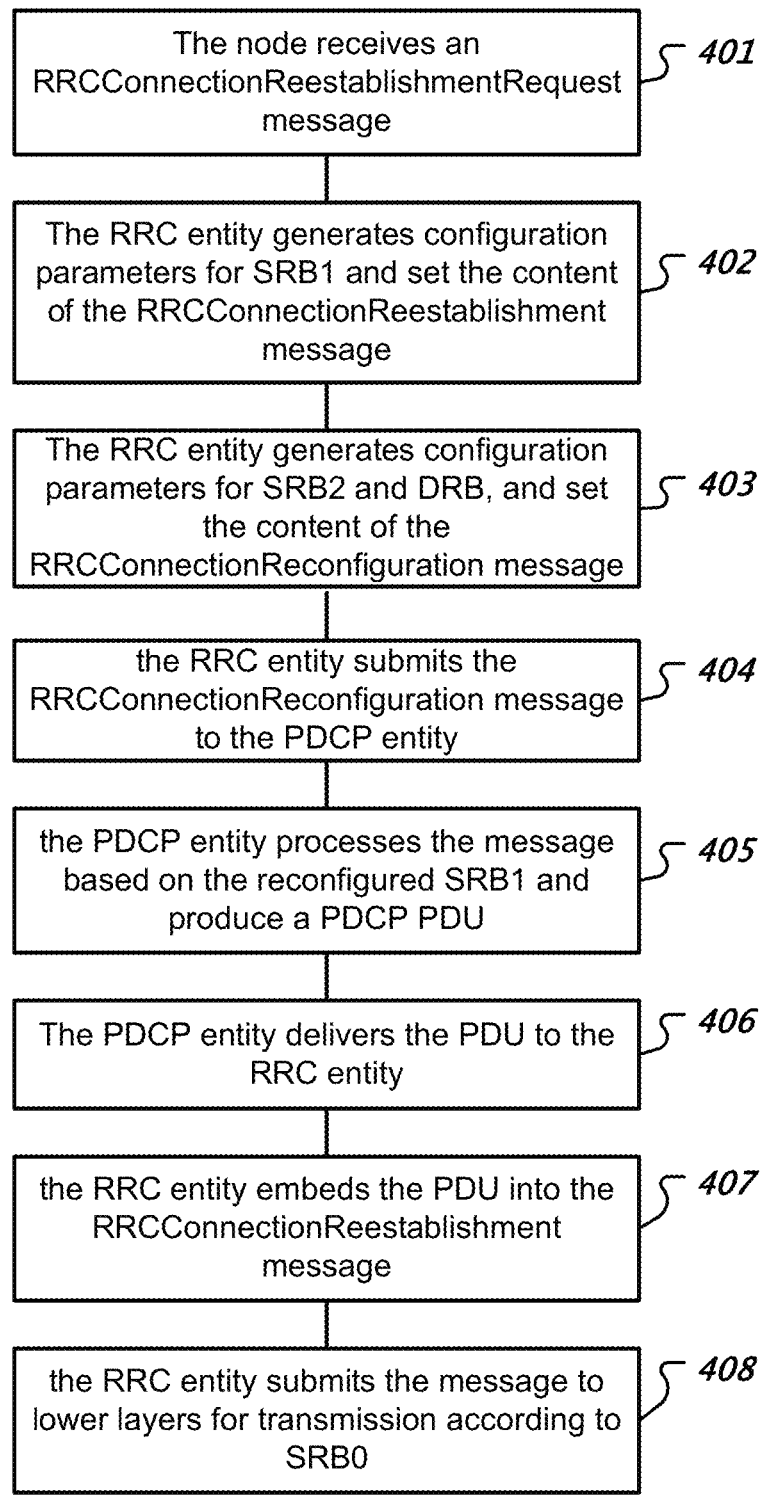
FIG. 4 is a flowchart representation of representative steps that a wireless communication node can take to generate a message in accordance with the disclosed technology.

FIG. 4 is a flowchart representation of representative steps that a wireless communication node can take in the RRC entity and the Packet Data Convergence Protocol (PDCP) entity to generate an RRCConnectionReestablishment message in accordance with the disclosed technology.

Step 401: The node receives a RRCConnectionReestablishmentRequest message from the terminal.

Step 402: The RRC entity of the node generates configuration parameter for Signaling Radio Bear 1 (SRB1) and sets the content of the RRCConnectionReestablishment message.

Step 403: The RRC entity also generates configuration parameters for SRB2 and Data Radio Bearer (DRB), and sets the content of RRCConnectionReconfiguration message.

Step 404: The RRC entity submits the RRCConnectionReconfiguration message to the PDCP entity for processing.

Step 405: The PDCP entity processes the message according to the reconfigured SRB1 and produce a corresponding PDCP PDU.

Step 406: The PDCP entity delivers the PDCP PDU to the RRC entity.

Step 407: The RRC entity embeds the Service Data Unit (SDU) into the RRCConnectionReestablishment message.

Step 408: The RRC entity submits the RRCConnectionReestablishment message to lower layers for transmission according to the SRB0.

Figure 5:
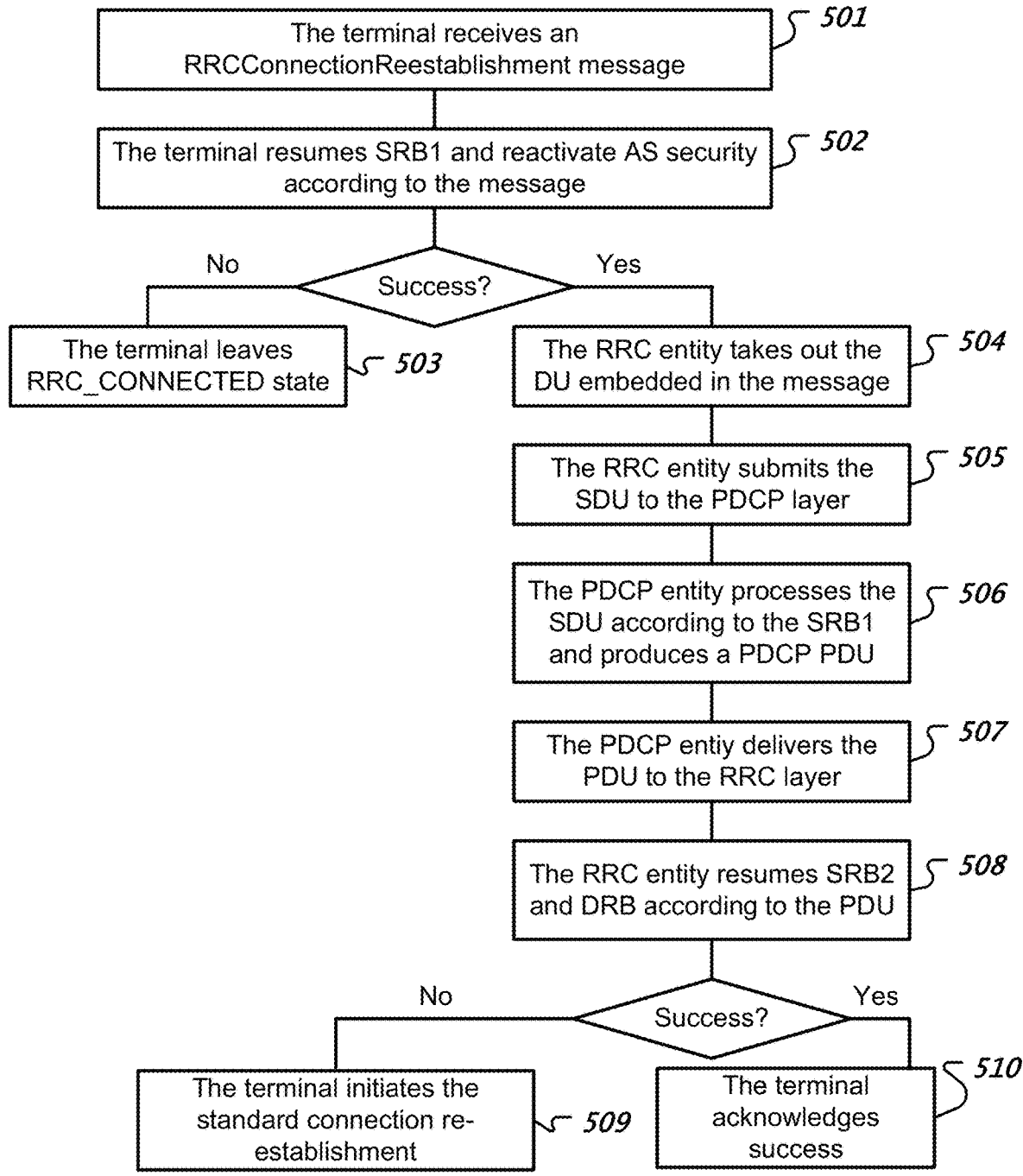
FIG. 5 is a flowchart representation of representative steps that a terminal can take to decode a message in accordance with the disclosed technology.

FIG. 5 is a flowchart representation of representative steps that a terminal can take in the RRC entity and the PDCP entity to decode the RRCConnectionReestablishment message in accordance with the disclosed technology.

Step 501: The terminal receives an RRCConnectionReestablishment message.

Step 502: The terminal resumes SRB1 and reactivates Access Stratum (AS) security according to the message.

Step 503: If step 502 fails, the terminal leaves the RRC_CONNECTED state.

Step 504: If step 502 succeeds, the RRC entity of the terminal takes out the data unit embedded in the message as a PDU.

Step 505: The RRC entity submits the PDU to the PDCP entity.

Step 506: The PDCP entity processes the PDU according to the SRB1 and produces a PDCP SDU.

Step 507: The PDCP entity delivers the PDU to the RRC entity.

Step 508: The RRC entity resumes SRB2 and DRB according to the PDU.

Step 509: If step 508 fails, the terminal initiates the standard connection re-establishment procedure.

Step 510: If step 508 succeeds, the terminal acknowledges the success.

Figure 6:
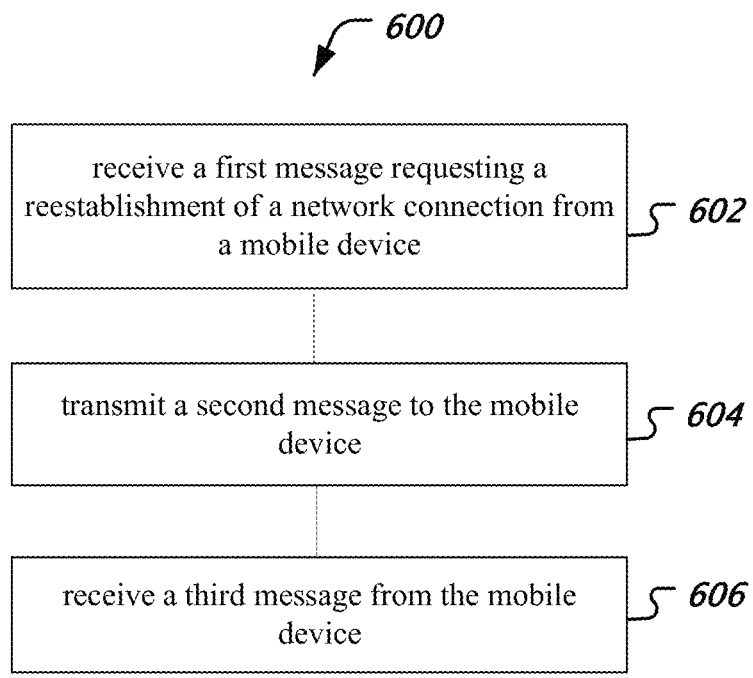
FIG. 6 is a flowchart representation of a method for wireless communication in accordance with the disclosed technology.

FIG. 6 is a flowchart representation of a method 600 for wireless communication. The method 600 includes, at 602, receiving, at a wireless communication node, a first message from a mobile device requesting a reestablishment of a network connection. The method 600 includes, at 604, transmitting, from the wireless communication node, a second message to the mobile device. The second message includes information for reestablishing and reconfiguring the network connection. The method 600 includes, at 606, receiving, at the wireless communication node, a third message from the mobile device acknowledging at least one of (1) completing a reestablishment of the network connection, or (2) completing a reconfiguration of the network connection.

Figure 7:
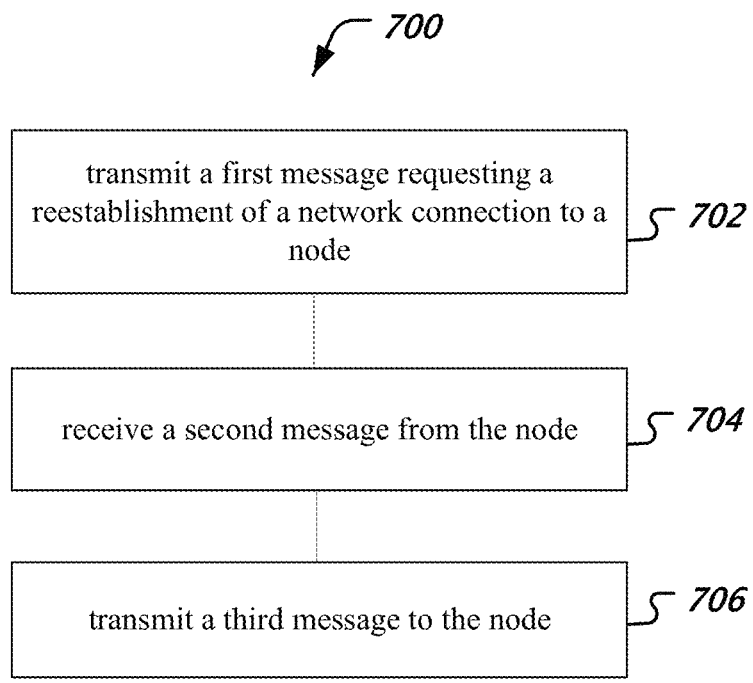
FIG. 7 is a flowchart representation of another method for wireless communication in accordance with the disclosed technology.

FIG. 7 is a flowchart representation of a method 700 for wireless communication. The method 700 includes, at 702, transmitting, from a mobile device, a first message to a wireless communication node requesting a reestablishment of a network connection. The method 700 includes, at 704, receiving, at the mobile device, a second message from the wireless communication node. The second message including information for reestablishing and reconfiguring the network connection. The method 700 includes, at 706, transmitting, from the mobile device, a third message to the wireless communication node acknowledging at least one of (1) completing a reestablishment of the network connection, or (2) completing a reconfiguration of the network connection.

Example Embodiment 2

During a handover and/or change of node operation, the terminal can maintain the source connection and the target connection at the same time. However, for the unlicensed spectrum, it is difficult to guarantee the success of both connections due to unreliable communications caused by the contention-based protocol and potential weak signals at the edge of the cell(s).

In order to enhance data transmission reliability during the handover and/or change of node operations, the source node may duplicate all the downlink PDCP SDUs for which transmissions have not been completed and acknowledged by the UE. The source node then can forward these PDCP SDUs with their respective Sequence Numbers (SNs) to the target node. The target may transmit the duplicated PDCP SDU with its own key.

Figure 8:
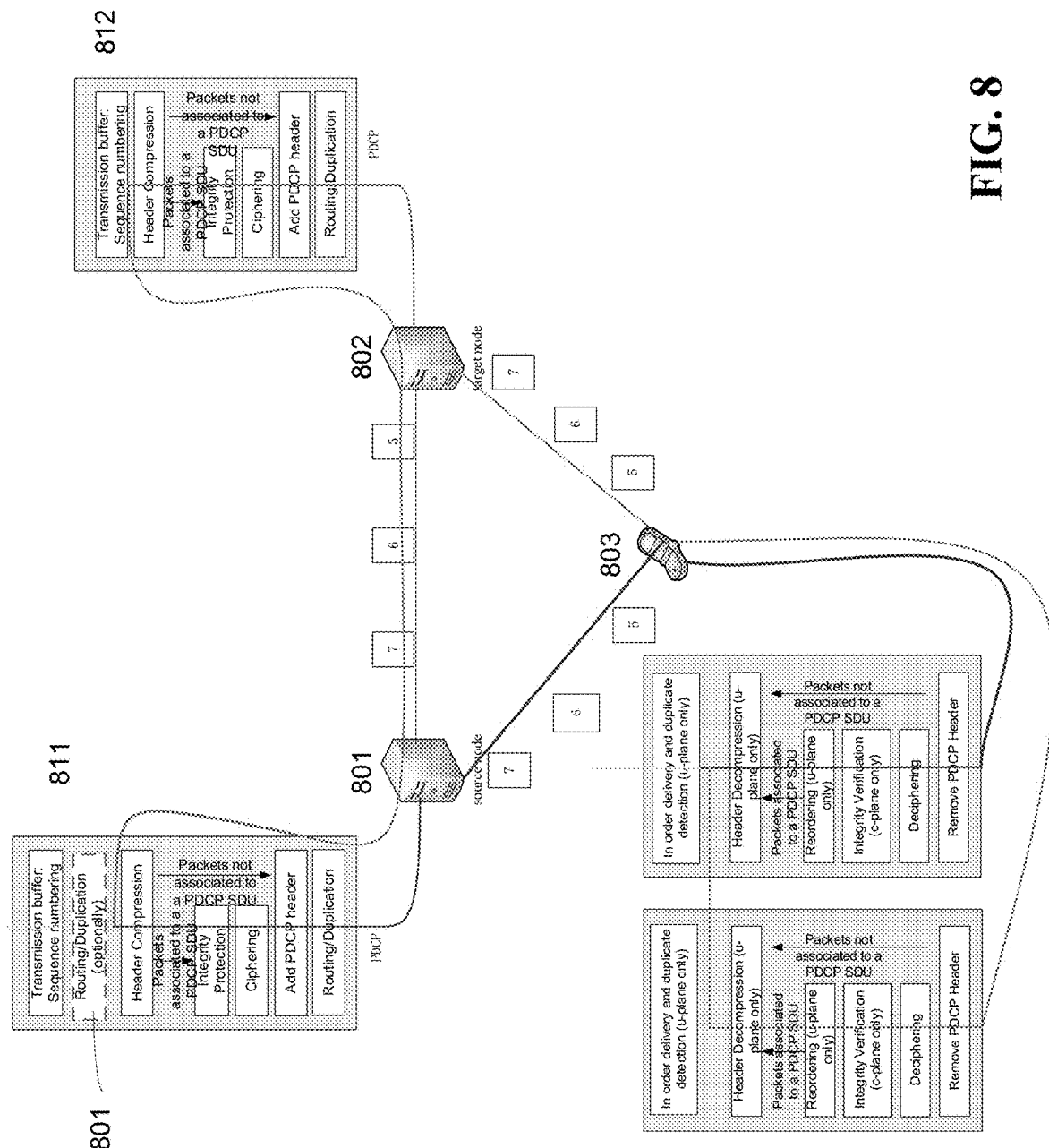
FIG. 8 shows a schematic diagram of a data flow for a downlink transmission in accordance with the disclosed technology.

FIG. 8 shows a schematic diagram of a data flow for a downlink transmission in accordance with the disclosed technology. In the embodiment shown in FIG. 8, the source node 801 includes an additional routing and duplication module 813 for handover or change of nodes in its PDCP entity 811 to perform packet duplication with its sequence number prior to the header compression of the data packets. When the source node 801 receives a PDCP SDU from upper layers, it associates the SDU with a PDCP SN. During a handover and/or a change of node operation, the source node 801 duplicates the PDCP SDU, and forwards the duplicated PDCP SDU to the target node 802. At the same time, the source node 801 continues to transmit data to the terminal 803. After receiving the forwarded data, the target node 802 can perform header compression of the PDCP SDU (if configured) directly in its PDCP entity 812.

In some embodiments, to communicate the PDCP SDUs SN that have been acknowledged by the terminal 803, the source node 801 and the target node 802 can communication with each other (e.g., via an Xn message) to inform the other node of the PDCP SDU SN.

The Xn message can be a new type of message. The Xn message can also reuse the structure of the SN STATUS TRANSFER message or use a new message. In some implementations, the Xn message includes the PDCP SDUs SN (e.g., as a list or a bitmap) that have been acknowledged by the terminal. After a node (e.g., either the source node or the target node) receives the acknowledged PDCP SDUs SN in the Xn message, it can determine that these PDCP SDU have be completed and discard them.

In some implementations, the Xn message includes the PDCP SDUs SN (e.g., as a list or a bitmap) that have not been acknowledged by the terminal. After a node (e.g., either the source node or the target node) receives the unacknowledged PDCP SDUs SN in the Xn message, it checks whether these PDCP SDUs have been acknowledge by the terminal on its end. If acknowledgments from the terminal for the PDCP SDUs are not received by either the source node or the target node, the node can determine that these PDCP SDU need to be transmitted and discard the PDCP SDU whose SN is smaller than the smallest SN among the unacknowledged PDCP SDUs.

When the terminal 803 receives the command for the handover or change of node operation, it can establish a new DRB and the corresponding PDCP, RLC, MAC entities for the target node 802. If the duplication mode is configured, the terminal can reorder the data it receives the data from both the target node and source node via a duplicate detection mechanism.

Figure 9A:
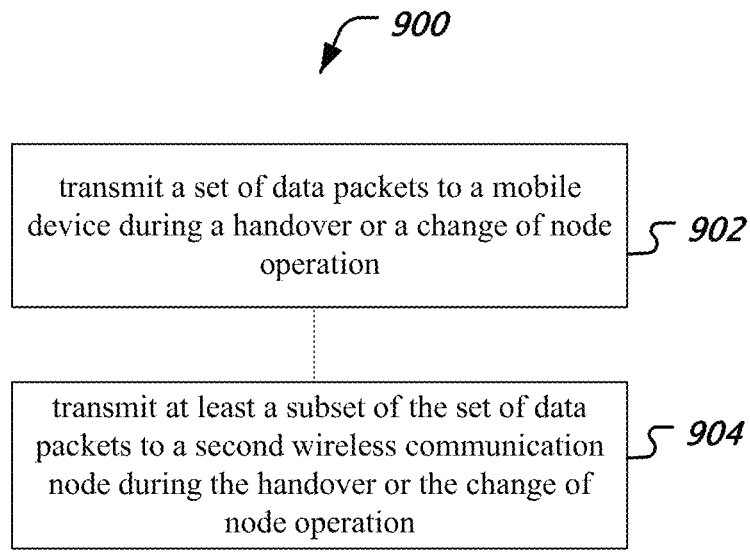
FIG. 9A is a flowchart representation of a method for wireless communication.

FIG. 9A is a flowchart representation of a method 900 for wireless communication. The method 900 includes, at 902, transmitting, from a first wireless communication node over a first transmission link, a set of data packets to a mobile device during a handover or a change of node operation. The method 900 also includes, at 904, transmitting, from the first wireless communication node over a second transmission link, the set of data packets to a second wireless communication node during the handover or the change of node operation to cause the second wireless communication to send the set of data packets to the mobile device over a third transmission link.

Figure 9B:
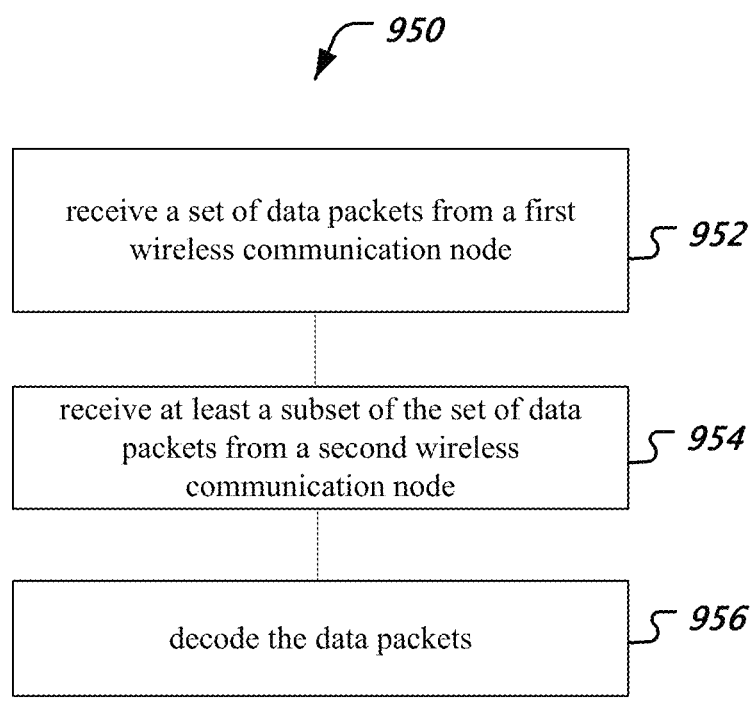
FIG. 9B is another flowchart representation of a method for wireless communication.

FIG. 9B is a flowchart representation of a method 950 for wireless communication. The method 950 includes, at 952, receiving, at a mobile device, a set of data packets from a first wireless communication node over a first wireless link during a handover operation. The method includes, at 954, receiving, at the mobile device, at least a subset of the set of data packets from a second wireless communication node over a second wireless link during the handover operation. The method 950 includes, at 956, decoding the data packets based on the set of data packets from the first wireless communication node and the set of data packets from the second wireless communication node.

Figure 10:
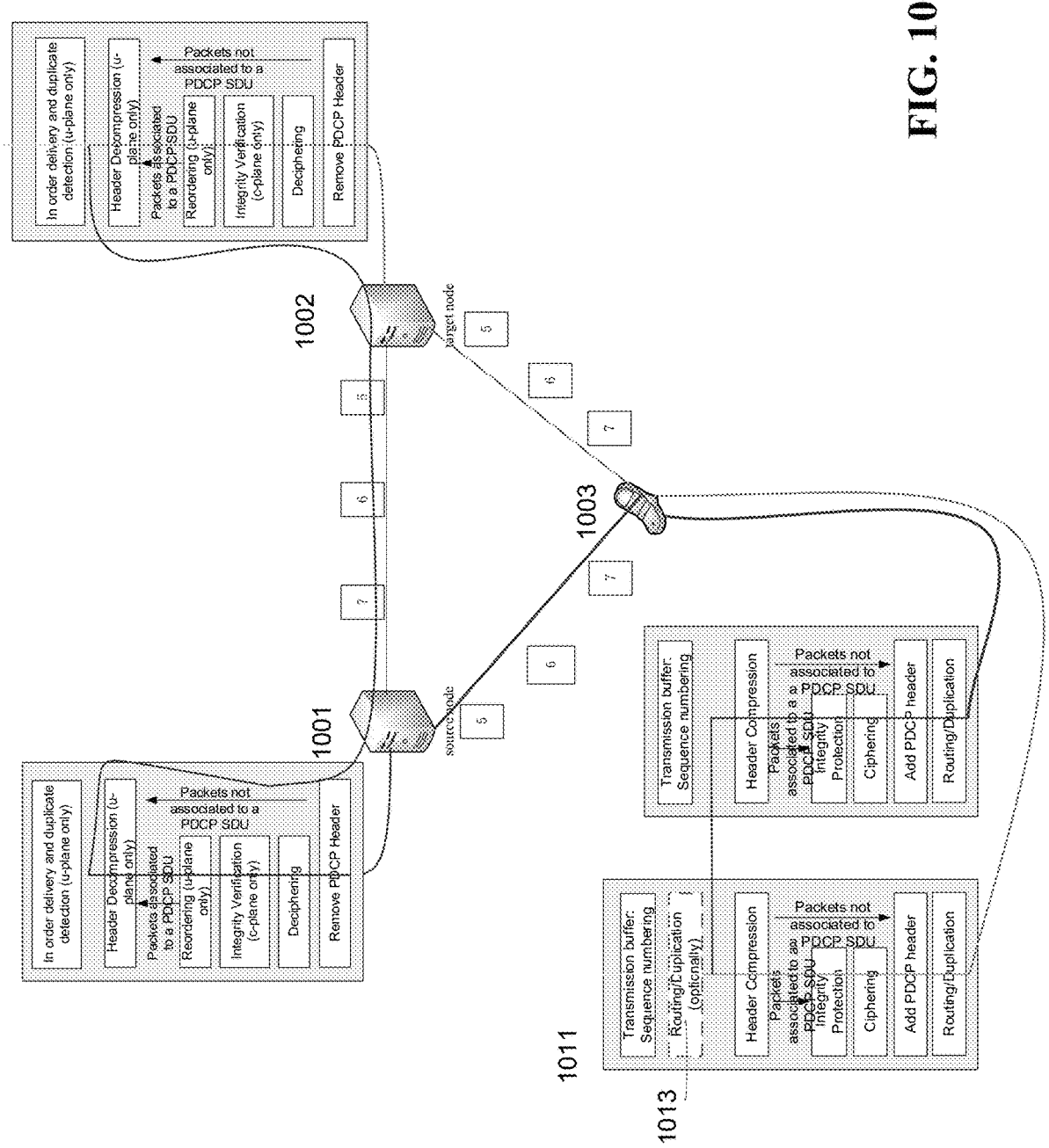
FIG. 10 shows a schematic diagram of a data flow for an uplink transmission in accordance with the disclosed technology.

FIG. 10 shows a schematic diagram of a data flow for an uplink transmission in accordance with the disclosed technology. In the embodiment shown in FIG. 10, when the terminal 1003 receives a command for a handover or a change of node operation, it can establish a new DRB and the corresponding PDCP, RLC, MAC entities for the target node. The new PDCP entity 1011 can include an additional routing and/or duplication module 1013 for handover or change of nodes to perform packet duplication with the sequence number of the terminal prior to the header compression of the data packets. When the terminal 1003 receives a PDCP SDU from upper layers, it associates the SDU with a PDCP SN. During a handover and/or a change of node operation, the terminal 1003 duplicates the PDCP SDU, and forwards the duplicated PDCP SDU to the target node 1002. At the same time, the terminal 1013 continues to transmit data to the source node 1001. The uplink data can be forwarded by either the source node or the target node to another node that is connected with the core network.

Both the source node and the target node receive the uplink data. In some embodiments, to communicate the PDCP SDUs SN that have been received by the node (e.g., either the source node or the target node), the two nodes can communication with each other (e.g., via an Xn message) to inform the other node of the PDCP SDU SN.

The Xn message can be a new type of message. The Xn message can also reuse the structure of the SN STATUS TRANSFER message. In some implementations, the Xn message includes the PDCP SDUs SN (e.g., as a list or a bitmap) that have been received and/or acknowledged by the node. If the node receives the PDCP SDUs SN, it can determine that these PDCP SDU have been completed.

In some embodiments, the Xn message can include the PDCP SDUs SN (e.g., as a list or a bitmap) that have not been acknowledged by the node. After a node (e.g., either the source node or the target node) receives the unacknowledged PDCP SDUs SN in the Xn message, it checks whether these PDCP SDUs have been acknowledged by itself. If the PDCP SDUs are not acknowledged by either the source node or the target node, the node can determine that these PDCP SDUs need to wait and forward the PDCP SDU whose SN is smaller than the smallest SN among the unacknowledged PDCP SDUs.

In the embodiment shown in FIG. 10, the target node 1002 can receive a duplicated copy of the data packets from the source node 1001. The target node 1002 then performs duplication detection based both the data packets from the terminal 1003 and the data packets from the source node 1001.

Figure 11A:
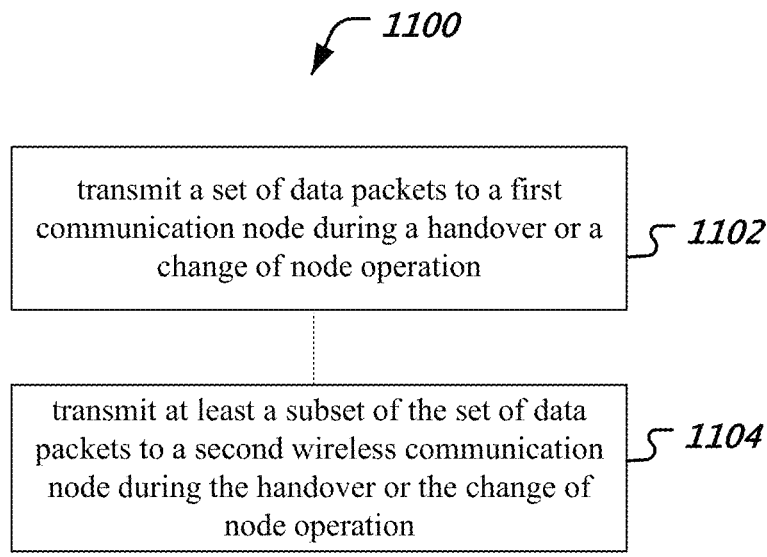
FIG. 11A is a flowchart representation of a method for wireless communication in accordance with the disclosed technology.

FIG. 11A is a flowchart representation of a method 1100 for wireless communication. The method 1100 includes, at 1102, transmitting, from a mobile device over a first transmission link, a set of data packets to a first wireless communication node during a handover operation or a change of node. The method 1100 also includes, at 1104, transmitting, from the mobile device over a second transmission link, at least a subset of the set of the data packets to a second wireless communication node during the handover operation or the change of node operation for assisting the first wireless communication node to decode the data packets.

Figure 11B:
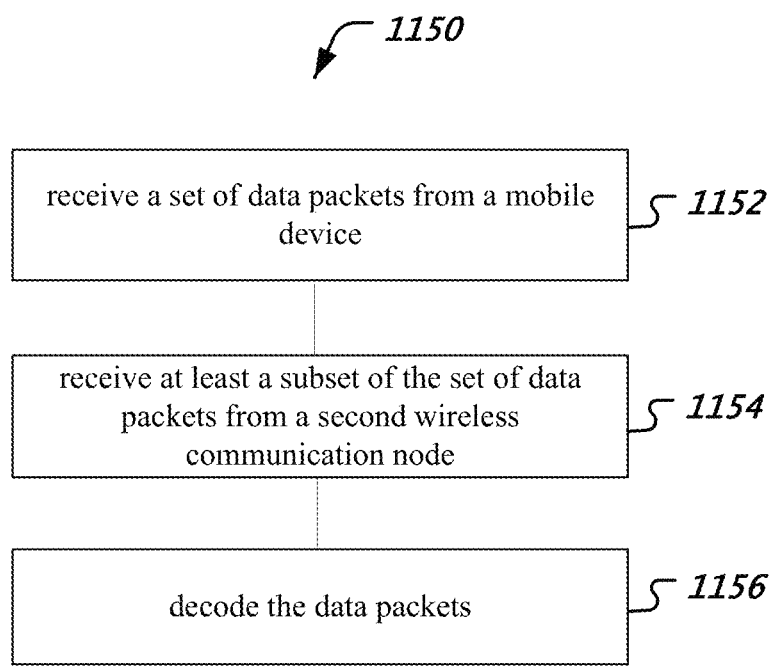
FIG. 11B is a flowchart representation of a method for wireless communication in accordance with the disclosed technology.

FIG. 11B is a flowchart representation of a method 1150 for wireless communication. The method 1150 includes, at 1152, receiving, at a first wireless communication node over a first transmission link, a set of data packets from a mobile device during a handover operation or a change of node operation. The method 1150 includes, at 1154, receiving, at the first wireless communication node over a second transmission link, at least a subset of the set of data packets from the second wireless communication node. The method 1150 also includes, at 1156, decoding, by the first wireless communication node, the data packets based on the set of the data packets from the mobile device and at least the subset of the set of data packets from the second wireless communication node.

Example Embodiment 3

Because a terminal at the edge of a cell is more likely to lose connections using the unlicensed spectrum, it is desirable for the terminal to know its location within a cell to initiate a handover operation in a timely manner.

In some embodiments, the serving node transmits a message to the terminal indicating the location of the terminal. For example, the node can indicate whether a terminal is located closer to the center or to the edge of the cell in a dedicated RRC message.

In some embodiments, the node transmits information, such has conditions and/or thresholds, for the terminal to determine if it is located close to the edge of the cell. For example, the node transmits a threshold value for Reference Signal Received Power (RSRP) to the terminal. If the terminal obtains an RSRP measurement whose absolute value is higher than the threshold, the terminal can determine that it is located close to the edge of the cell.

Example Embodiment 4

Due to the contention-base protocol for the unlicensed spectrum, late transmissions of the RRC messages can happen more frequently, resulting in more handovers that are too late. To reduce the number of "too late" handovers, the serving node can transmit information, such as conditions and/or thresholds, for the terminal to determine when to initiate a handover procedure. After obtaining such information from the node, the terminal can initiate a handover operation in advance, thereby hiding some of the latencies introduced by the contention-based protocol (e.g., LBT).

For example, in some embodiments, the following conditions and/or thresholds can be used by the terminal to determine if a handover procedure needs to be initiated:

1. $M_n + Ofn + Ocn - Hys > Mp + Ofp + Ocp - Off$      Eq. (1)

2. $Rn < R_{threshold}$, or      Eq. (2)

3. $COn < CO_{threshold}$      Eq. (3)

In Eq. (1), the variables are defined as follows:

Mn is the measurement result of a neighboring cell, not taking into account any offsets.

Ofn is the frequency specific offset of the frequency of the neighboring cell (e.g., offsetFreq as defined within measObjectEUTRA corresponding to the frequency of the neighbor cell).

Ocn is the cell specific offset of the neighboring cell (e.g., cellIndividualOffset as defined within measObjectEUTRA corresponding to the frequency of the neighboring cell), and set to zero if not configured for the neighboring cell.

Mp is the measurement result of the PCell or the Primary Secondary Cell (PSCell), not taking into account any offsets.

Ofp is the frequency specific offset of the frequency of the PCell/PSCell (e.g., offsetFreq as defined within measObjectEUTRA corresponding to the frequency of the PCell/PSCell).

Ocp is the cell specific offset of the PCell/PSCell (e.g., cellIndividualOffset as defined within measObjectEUTRA corresponding to the frequency of the PCell/PSCell), and is set to zero if not configured for the PCell/PSCell.

Hys is the hysteresis parameter for the A3 event (e.g., hysteresis as defined within reportConfigEUTRA for this event).

Off is the offset parameter for this event (e.g., a3-Offset as defined within reportConfigEUTRA for this event).

Mn, Mp are expressed in dBm in case of RSRP, or in dB in case of RSRQ and RS-SINR. Ofn, Ocn, Ofp, Ocp, Hys, Off are expressed in dB.

In Eq. (2), the variables are defined as follows:

Rn is the measurement result (e.g., Received Strength Signal Indicator (RSSI)) of the neighboring cell. $R_{threshold}$ is the threshold parameter corresponding to the RSSI.

In Eq. (3), the variables are defined as follows:

COn is the measurement result (e.g., Channel Occupancy (CO)) of the neighboring cell. $CO_{threshold}$ is the threshold parameter corresponding to the CO.

For example, the terminal performs RSSI and channel occupancy measurements. The node can accordingly inform the terminal of the condition to initiate the connection re-establishment procedure (e.g., thresholds for the RSSI and/or channel occupancy measurements). When the measured RSSI is higher than a threshold, and/or the channel occupancy is higher than a threshold, the terminal can initiate the connection re-establishment procedure.

Example Embodiment 5

As discussed above, during a handover and/or change of node operation, the terminal can maintain the source connection and the target connection at the same time. However, for the unlicensed spectrum, the connections can be unreliable due to the contention-based protocol and potential weak signals at the edge of the cell(s). Therefore, in some embodiments, the source node and the target node can coordinate a Time Division Multiplexing (TDM) pattern for the spectrum to reduce interference and delay—one node can avoid using the contention window reserved for the other node.

Figure 12:
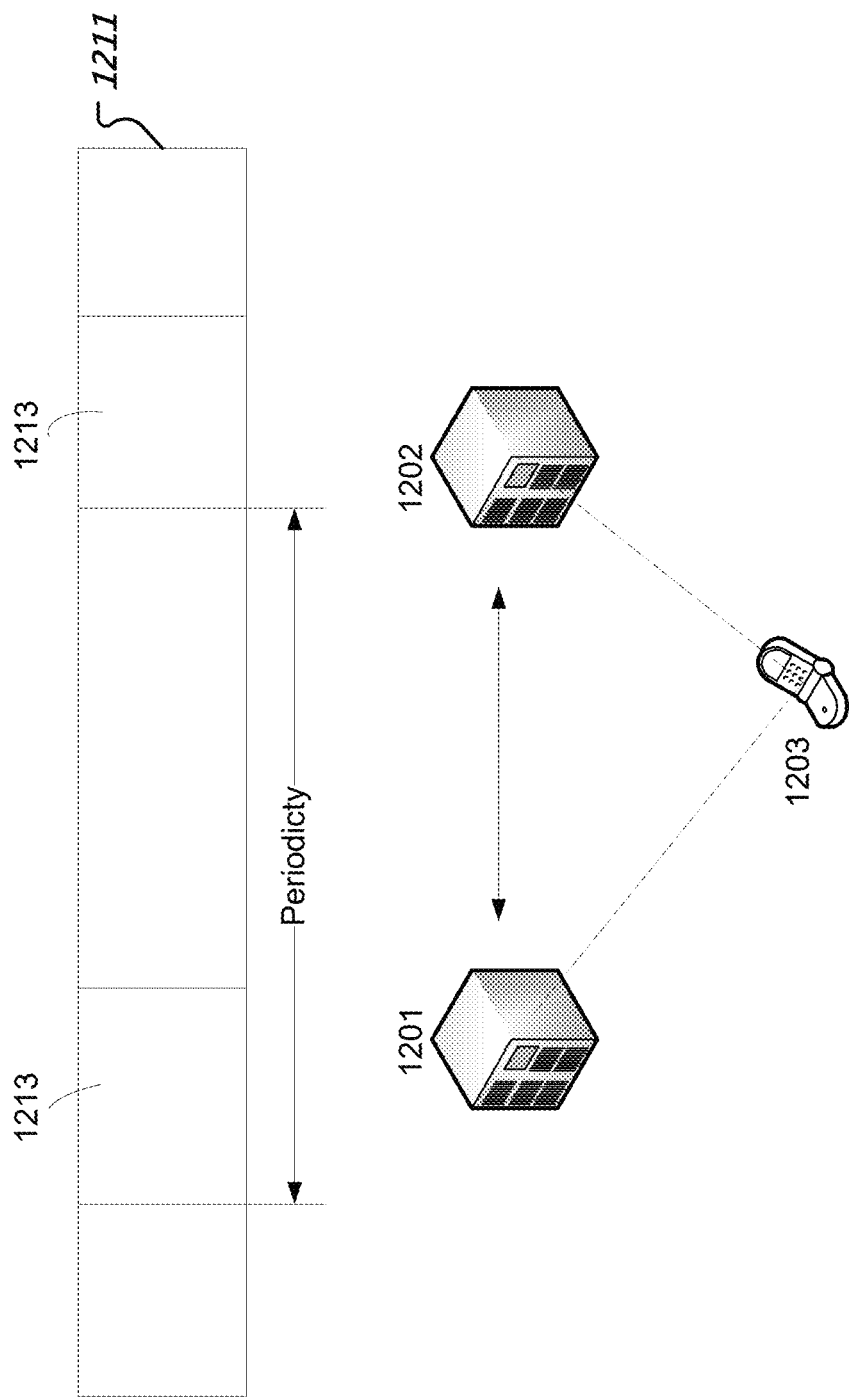
FIG. 12 shows a schematic diagram of a representative TMD pattern in accordance with the disclosed technology.

FIG. 12 shows a schematic diagram of a representative TMD pattern in accordance with the disclosed technology. The source node 1201 and the target node 1202 coordinate to obtain a TDM pattern 1211. In some embodiments, a node can pre-allocate uplink and/or downlink grant(s) for the terminal. The terminal can correspondingly transmit data using the pre-allocated grants. In some implementations, the pre-allocated grant(s) are allocated according to the TMD pattern to reduce interference and delay. As shown in FIG. 12, the TDM pattern 1211 includes one or more preallocated grants 1213. Each grant includes a number of contiguous symbols or frames in the time domain. In some embodiments, a grant can be represented by a start time, a duration (e.g., a transmission window), and a periodicity. By including multiple time-domain symbols and/or frames, the transmission window enhances the probability that the terminal completes a successful transmission at a particular time-domain location. In some implementations, the preallocated grant(s) can be included the RRCConnectionReconfiguration message.

In some embodiments, the source node 1201 and the target node 1202 can coordinate the TDM pattern for the preallocated uplink/downlink/downlink grant(s). First, the source node 1201 can include configuration information for the preallocated uplink/downlink grant grant(s) of the source node in a handover request message. The target node 1203 can include configuration information for the preallocated uplink/downlink grant(s) of the target node in a corresponding handover request acknowledge message. The source node 1201 and the target node 1203 may have different proallocated uplink/downlink grants, and can choose whether to modify the respective grant configuration(s) to reach an agreement.

Example Embodiment 6

Using the contention-based protocol (e.g., LBT), transmissions of Radio Link Monitoring (RLM) Reference Signals (RS) may fail. Such failures typically indicate a frequency overload. It is thus desirable for the terminal to discover the problem and recover the link in a timely manner.

Figure 15:
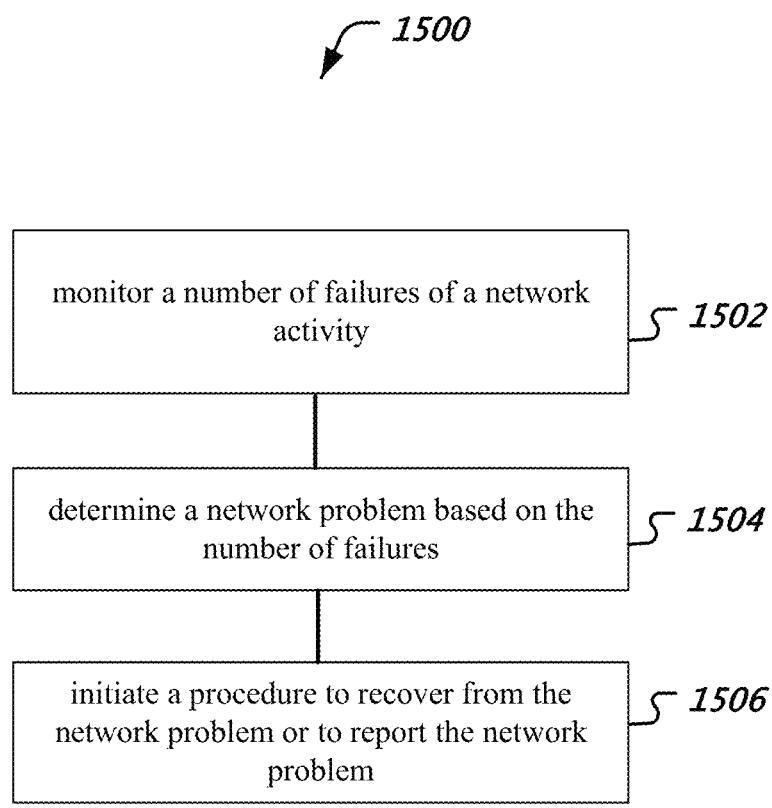
FIG. 15 is a flowchart representation of a method for wireless communication in accordance with the disclosed technology.

FIG. 15 is a flowchart representation of a method 1500 for wireless communication. The method 1500 includes, at 1502, monitoring, at a mobile device, a first number of failures of a network activity within a first evaluation period. The method 1500 includes, at 1504, determining, by the mobile device, based on the first number of failures of the network activity, a network problem caused by a network access using a contention-based protocol. The method 1500 includes, at 1506, initiating, by the mobile device, a procedure to recover from the network problem or to report the network problem.

For example, the terminal can evaluate or determine whether one or more RLM-RS are transmitted successfully from the node. The terminal can further determine how many RLM-RS are transmitted successfully from the node and/or how many RLM-RS fail to be transmitted successfully from the node.

For example, the terminal can monitor RLM-RS transmissions in an evaluation period T1 using the LBT as the contention-based protocol. When the number of the RLM-RS that fail to be transmitted successfully in the evaluation period T1 is higher than a threshold, lower layers (e.g., Layer 1) of the terminal can send an indication to the RRC entity indicating that there is an RLM-RS LBT problem. Alternatively, when the number of the RLM-RS that are transmitted successfully in the evaluation period T1 is lower than a threshold, lower layers (e.g., Layer 1) of the terminal can send an indication to the RRC entity indicating that there is an RLM-RS LBT problem.

In some implementations, the threshold can be either zero or all of the RLM-RS transmitted. For example, when none of RLM-RS are transmitted successfully in the evaluation period T1, lower layers (e.g., Layer 1) of the terminal can send an indication to the RRC entity indicating that there is an RLM-RS LBT problem. When some of the RLM-RS are transmitted successfully (i.e., the number of RLM-RS that are transmitted successfully in the evaluation period T1 is greater than zero), lower layers (e.g., Layer 1) of the terminal do not send any indication to the RRC entity.

The RRC entity can maintain a different evaluation period T3 (e.g., T3>T1). The entity can start a timer and detect an RLM-RS LBT problem after receiving N consecutive indications that there is an RLM-RS LBT problem from the lower layers within the evaluation period T3.

In some embodiments, the terminal detects the RLM-RS LBT problems in the PCell, the terminal can leave the RRC_CONNECTED state if AS security has not been activated. In some implementations, the terminal can initiate the connection re-establishment procedure.

In some embodiments, the terminal detects the RLM-RS LBT problems in the PSCell, the terminal can initiate the Secondary Cell Group (SCG) failure information procedure. In some implementations, the SCG failure information message can carry information such as the failureType (which can be set to the RLM-RS LBT detection failure), and measurement results with corresponding RSSI and channel occupancy for the inter-frequency.

Example Embodiment 7

In some embodiments, the terminal can monitor RLM-RS transmissions in more than one evaluation periods.

For example, the terminal can monitor RLM-RS transmissions in an evaluation period T1 using the LBT as the contention-based protocol. When the number of the RLM-RS that fail to be transmitted successfully in the evaluation period T1 is higher than a threshold, lower layers (e.g., Layer 1) of the terminal can send an indication to the RRC entity indicating that there is an RLM-RS LBT problem. Alternatively, when the number of the RLM-RS that are transmitted successfully in the evaluation period T1 is lower than a threshold, lower layers (e.g., Layer 1) of the terminal can send an indication to the RRC entity indicating that there is an RLM-RS LBT problem.

The terminal can use a second evaluation period T2. When the number of RLM-RS that fail to be transmitted successfully in the evaluation period T2 is lower than a threshold, lower layers (e.g., Layer 1) of the terminal send an indication to the RRC indicating an RLM-RS LBT recovery. Alternatively, when the number of the transmitted RLM-RS in the evaluation period T2 is higher than a threshold, lower layers (e.g., Layer 1) of the terminal sends an indication to the RRC indicating an RLM-RS LBT recovery.

The RRC entity can maintain a different evaluation period T3 (e.g., T3>T1). The entity can start a timer and detect an RLM-RS LBT problem after receiving N1 consecutive indications that there is an RLM-RS LBT problem from the lower layers within the evaluation period T3.

While the timer is running, the RRC entity can stop the timer upon receiving N2 consecutive indications indicating an RLM-RS LBT recovery from lower layers. The RRC entity then can determine that there is a recovery from the RLM-RS LBT problems.

In some embodiments, the terminal detects RLM-RS LBT problems in the PCell, the terminal can leave the RRC_CONNECTED state if AS security has not been activated. In some implementations, the terminal can initiate the connection re-establishment procedure.

In some embodiments, the terminal detects RLM-RS LBT problems in the PSCell, the terminal can initiate the Secondary Cell Group (SCG) failure information procedure. In some implementations, the SCG failure information message can carry information such as the failureType (which can be set to the RLM-RS LBT detection failure), and measurement results with corresponding RSSI and channel occupancy for the inter-frequency.

Example Embodiment 8

Using the contention-based protocol (e.g., LBT), transmissions of Service Request (SR) or the random-access procedure (e.g., PRACH) may be blocked. If a SR transmission or a random-access procedure is blocked for many times, this indicates that there is a frequency overload and/or a delay of the transmission. It is thus desirable for the terminal to determine whether SR transmissions and/or random-access procedures are performed successfully.

In some embodiments, when the number of SR LBT failures or the number of preamble LBT failures reaches a threshold, the MAC entity indicates a SR LBT problem or a preamble LBT problem to the RRC entity.

In some embodiments, the terminal detects the SR LBT problems or the preamble LBT problems in the PCell, the terminal can leave the RRC_CONNECTED state if AS security has not been activated. In some implementations, the terminal can initiate the connection re-establishment procedure.

In some embodiments, the terminal detects the SR LBT problems or the preamble LBT problems in the PSCell, the terminal can initiate the Secondary Cell Group (SCG) failure information procedure. In some implementations, the SCG failure information message can carry information such as the failureType (which can be set to the SR LBT failure or the preamble LBT failure), and measurement results with corresponding RSSI and channel occupancy for the inter-frequency.

Figure 13:
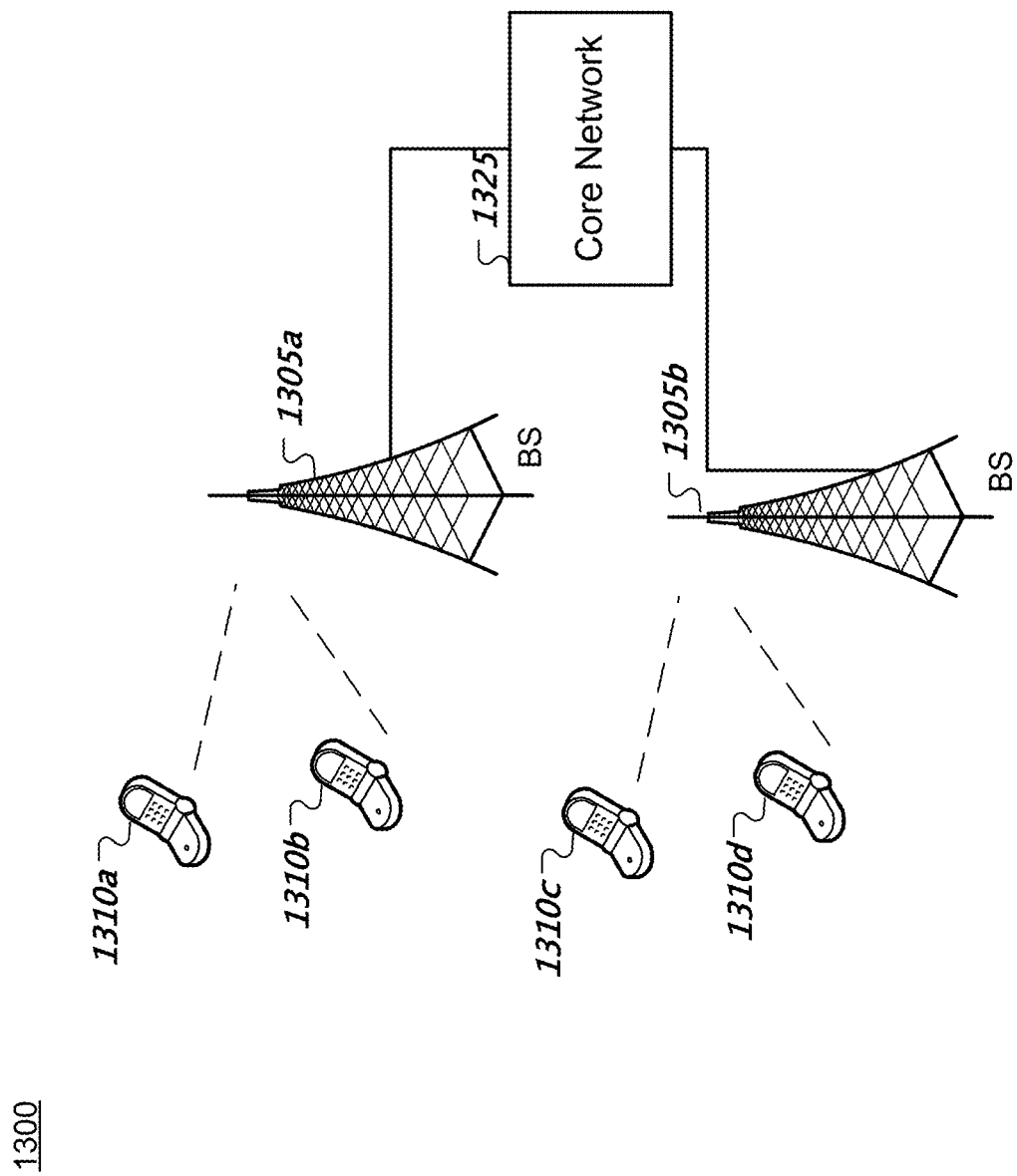
FIG. 13 shows an example of a wireless communication system where techniques in accordance with one or more embodiments of the present technology can be applied.

FIG. 13 shows an example of a wireless communication system 1300 where techniques in accordance with one or more embodiments of the present technology can be applied. A wireless communication system 1300 can include one or more base stations (BSs) 1305a, 1305b, one or more wireless devices 1310a, 1310b, 1310c, 1310d, and a core network 1325. A base station 1305a, 1305b can provide wireless service to wireless devices 1310a, 1310b, 1310c and 1310d in one or more wireless sectors. In some implementations, a base station 1305a, 1305b includes directional antennas to produce two or more directional beams to provide wireless coverage in different sectors.

The core network 1325 can communicate with one or more base stations 1305a, 1305b. The core network 1325 provides connectivity with other wireless communication systems and wired communication systems. The core network may include one or more service subscription databases to store information related to the subscribed wireless devices 1310a, 1310b, 1310c, and 1310d. A first base station 1305a can provide wireless service based on a first radio access technology, whereas a second base station 1305b can provide wireless service based on a second radio access technology. The base stations 1305a and 1305b may be co-located or may be separately installed in the field according to the deployment scenario. The wireless devices 1310a, 1310b, 1310c, and 1310d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 14:
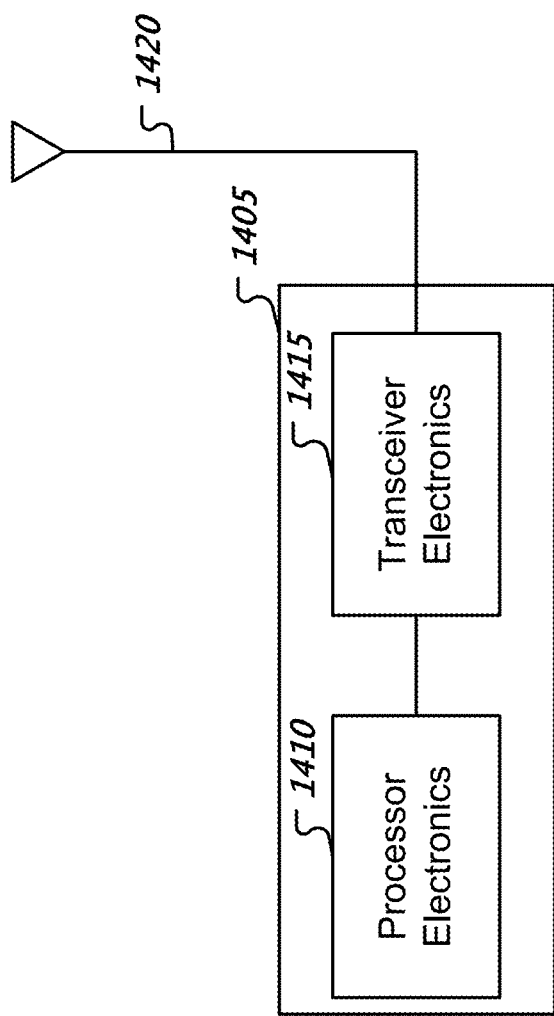
FIG. 14 is a block diagram representation of a portion of a radio station.

FIG. 14 is a block diagram representation of a portion of a radio station. A radio station 1405 such as a base station or a wireless device (or UE) can include processor electronics 1410 such as a microprocessor that implements one or more of the wireless techniques presented in this document. The radio station 1405 can include transceiver electronics 1415 to send and/or receive wireless signals over one or more communication interfaces such as antenna 1420. The radio station 1405 can include other communication interfaces for transmitting and receiving data. Radio station 1405 can include one or more memories (not explicitly shown) configured to store information such as data and/or instructions. In some implementations, the processor electronics 1410 can include at least a portion of the transceiver electronics 1415. In some embodiments, at least some of the disclosed techniques, modules or functions are implemented using the radio station 1405.

It is thus evident that methods and corresponding apparatus relating to efficient transmissions using the unlicensed spectrum are disclosed. The disclosed techniques can be used in various embodiments to reduce transmission delay and interference caused by a contention-based protocol for medium access, and to increase the reliability of the transmissions.

In one representative aspect, a method for wireless communication is disclosed. The method includes receiving, at a wireless communication node, a first message from a mobile device requesting a reestablishment of a network connection; transmitting, from the wireless communication node, a second message to the mobile device, the second message including information for reestablishing and reconfiguring the network connection; and receiving, at the wireless communication node, a third message from the mobile device acknowledging at least one of (1) completing a reestablishment of the network connection, or (2) completing a reconfiguration of the network connection.

In some embodiments, the reestablishment of the network connection is achieved using less than five message transmissions between the wireless communication node and the mobile device. In some embodiments, the information for reconfiguring the network connection is carried in a protocol data unit produced by a Packet Data Convergence Protocol entity. In some embodiments, the information for reconfiguring the network connection is carried by a protocol data unit packet or an octet string included in the second message.

In another representative aspect, a method for wireless communication is disclosed. The method includes transmitting, from a mobile device, a first message to a wireless communication node requesting a reestablishment of a network connection; receiving, at the mobile device, a second message from the wireless communication node, the second message including information for reestablishing and reconfiguring the network connection; and transmitting, from the mobile device, a third message to the wireless communication node acknowledging at least one of (1) completing a reestablishment of the network connection, or (2) completing a reconfiguration of the network connection.

In some embodiments, the reestablishment of the network connection is achieved using less than five message transmissions between the wireless communication node and the mobile device. In some embodiments, the information for reconfiguring the network connection is carried in a protocol data unit produced by a Packet Data Convergence Protocol entity. In some embodiments, the information for reconfiguring the network connection is carried by a protocol data unit packet or an octet string included in the second message.

In another representative aspect, a method for wireless communication includes transmitting, from a first wireless communication node over a first transmission link, a set of data packets to a mobile device during a handover or a change of node operation; and transmitting, from the first wireless communication node over a second transmission link, at least a subset of the set of data packets to a second wireless communication node during the handover or the change of node operation to cause the second wireless communication to send at least the subset of the set of data packets to the mobile device over a third transmission link.

In some embodiments, the subset of the set of data packets transmitted over the second transmission link is not acknowledged by the mobile device. In some implementations, the subset of the set of data packets is duplicated by a packet data convergence protocol entity of the first wireless communication node with a sequence number of the first wireless communication node prior to a head compression of the subset of the set of data packets.

In some embodiments, the method includes transmitting, from the first wireless communication node over the second transmission link, a message to the second wireless communication node during the handover or the change of node operation, the message including information of a second subset of the set of data packets that is acknowledged by the mobile device.

In some embodiments, the method includes configuring the handover or the change of node operation by: transmitting, from the first wireless communication node, a first message to the second wireless communication node requesting a handover or a change of node operation from the first wireless communication node to the second wireless communication node, wherein the first message includes information for configuring a first set of transmission grants according to a first time-domain multiplexing pattern; receiving, at the first wireless communication node, a second message from the second wireless communication node acknowledging the hand over or the change of node operation, wherein the second message includes information for configuring a second set of transmission grants according to a second time-domain multiplexing pattern; and determining, based on the first and second time-domain multiplexing patterns, a third set of transmission grants according to a third time-domain multiplex pattern.

In some embodiments, each set of the first, second, and third sets transmission grants is organized according to a time division multiplexing pattern. In some implementations, each grant in the time division multiplexing pattern is represented by at least one of the following: a start time, a transmission window, or a periodicity of the grant.

In some embodiments, the method includes transmitting, from the first wireless communication node, information for assisting the mobile device to determine when to initiate the handover or the change of node operation. In some implementations, the information includes at least one of: a threshold value for a Received Strength Signal Indicator, or a threshold value for a Channel Occupancy.

In some embodiments, the method includes transmitting, from the first wireless communication node, information for assisting the mobile device to determine whether the mobile device is located at an edge of a cell provided by the first wireless communication node. In some implementations, the information includes at least a threshold value for a Reference Signal Received Power measurement.

In another representative aspect, a method for wireless communication includes receiving, at a mobile device, a set of data packets from a first wireless communication node over a first wireless link during a handover operation or a change of node operation; receiving, at the mobile device, at least a subset of the set of data packets from a second wireless communication node over a second wireless link during the handover operation or the change of node; and decoding the data packets based on the set of data packets from the first wireless communication node and at least the subset of the set of data packets from the second wireless communication node.

In some embodiments, the method includes performing duplication detection based on the set of data packets from the first wireless communication node and the subset of the set of data packets from the second wireless communication node.

In some embodiments, the method includes receiving, at the mobile device, information from the first wireless communication node for determining when to initiate the handover operation or the change of node operation. In some implementations, the information includes at least one of: a threshold value for a Received Strength Signal Indicator, or a threshold value for a Channel Occupancy.

In some embodiments, the method includes receiving, at the mobile device, information from the first wireless communication node for determining whether the mobile device is located at an edge of a cell provided by the first wireless communication node. In some implementations, the information includes at least a threshold value for a Reference Signal Received Power measurement.

In another representative aspect, a method for wireless communication includes transmitting, from a mobile device, a set of data packets to a first wireless communication node during a handover operation or a change of node; and transmitting, from the mobile device, at least a subset of the set of the data packets to a second wireless communication node during the handover operation or the change of node operation for assisting the first wireless communication node to decode the data packets.

In some embodiments, the subset of the set of data packets is not acknowledged by the first wireless communication node. In some implementations, the subset of the set of data packets is duplicated by a packet data convergence protocol entity with a sequence number of the mobile device prior to a header compression of the subset of the set of data packets.

In some embodiments, the method includes receiving, at the mobile device, information for assisting the mobile device to determine when to initiate the handover or the change of node operation from the first wireless communication node. In some embodiments, the method includes receiving, at the mobile device, information from the first wireless communication node for assisting the mobile device to determine whether the mobile device is located at an edge of a cell provided by the first wireless communication node.

In another representative aspect, a method for wireless communication includes receiving, at a first wireless communication node, a set of data packets from a mobile device during a handover operation or a change of node operation; receiving, at the first wireless communication node over a second transmission link, at least a subset of the set of data packets from the second wireless communication node; and decoding, by the first wireless communication node, the data packets based on the set of the data packets from the mobile device and at least the subset of the set of data packets from the second wireless communication node.

In some embodiments, the method includes receiving, at the first wireless communication node, a message from the second wireless communication node, the message including information of at least the subset of the set of data packets received at the second wireless communication node. In some embodiments, the method includes performing, at the first wireless communication node, duplication detection based on the set of data packets from the mobile device and the subset of the set of data packets from the second wireless communication node.

In some embodiments, the method includes configuring the handover or the change of node operation by: transmitting, from the first wireless communication node, a first message to the second wireless communication node requesting a handover or a change of node operation from the first wireless communication node to the second wireless communication node, wherein the first message includes information for configuring a first set of transmission grants according to a first time-domain multiplexing pattern; receiving, at the first wireless communication node, a second message from the second wireless communication node acknowledging the hand over or the change of node operation, wherein the second message includes information for configuring a second set of transmission grants according to a second time-domain multiplexing pattern; and determining, based on the first and second time-domain multiplexing patterns, a third set of transmission grants according to a third time-domain multiplex pattern.

In some embodiments, each set of the first, second, and third sets transmission grants is organized according to a time division multiplexing pattern. In some implementations, each grant in the time division multiplexing pattern is represented by at least one of the following: a start time, a transmission window, or a periodicity of the grant.

In some embodiments, the method includes transmitting, from the first wireless communication node, information for assisting the mobile device to determine when to initiate the handover or the change of node operation. In some implementations, the information includes at least one of: a threshold value for a Received Strength Signal Indicator, or a threshold value for a Channel Occupancy.

In some embodiments, the method includes transmitting, from the first wireless communication node, information for assisting the mobile device to determine whether the mobile device is located at an edge of a cell provided by the first wireless communication node. In some implementations, the information includes at least a threshold value for a Reference Signal Received Power measurement.

In another representative aspect, a method for wireless communication includes monitoring, at a mobile device, a number of failures of a network activity within a first evaluation period; determining, by the mobile device, based on the number of failures of the network activity, a network problem has occurred, the network problem caused by a network access using a contention-based protocol; and initiating, by the mobile device, a procedure to recover from the network problem or to report the network problem.

In some embodiments, determining the network problem comprises comparing the number of failures of the network activity to a threshold. In some embodiments, the method includes monitoring, at the mobile device, the second number of failures of the network activity within a second evaluation period; and determining, by the mobile device, based on the first and second numbers of failures of the network activity, a recovery from the network problem has occurred.

In some embodiments, the network activity includes at least one of the following: a Radio Link Monitoring Reference Signal transmission, a Service Request transmission, or a random-access procedure. In some embodiments, the method includes determining, by the mobile device, that the network problem happens in a primary cell provided by a network, wherein the procedure to recover from the network problem or to report the network problem includes a Radio Resource Control reestablishment procedure. In some embodiments, the method includes determining, by the mobile device, that the network problem happens in a primary secondary cell provided by a network, wherein the procedure to recover from the network problem or to report the network problem includes a Secondary Cell Group failure information procedure.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for wireless communication, comprising:
receiving, at a wireless communication node, a first message from a mobile device requesting a reestablishment of a network connection;
transmitting, from the wireless communication node, a second message to the mobile device, the second message including information for reestablishing the network connection and information for reconfiguring the network connection, wherein the information for reconfiguring the network connection is carried in a protocol data unit packet produced by a Packet Data Convergence Protocol entity; and
receiving, at the wireless communication node, a third message from the mobile device indicating completing a reestablishment of the network connection, wherein the third message is received in response to a failure to complete a reconfiguration of the network connection by the mobile device,
wherein the first message, the second message, and the third message are transmitted as part of a contention-based protocol in an unlicensed spectrum.

2. The method of claim 1, wherein the information for reconfiguring the network connection is carried by an octet string included in the second message.

3. The method of claim 1, further comprising:
transmitting, from the wireless communication node over a first transmission link, a set of data packets to the mobile device during a handover or a change of node operation; and
transmitting, from the wireless communication node over a second transmission link, at least a subset of the set of data packets to a second wireless communication node during the handover or the change of node operation to cause the second wireless communication node to send at least the subset of the set of data packets to the mobile device over a third transmission link.

4. The method of claim 3, wherein the subset of the set of data packets is duplicated by a packet data convergence protocol entity with a sequence number of the wireless communication node prior to a header compression of the subset of the set of data packets.

5. The method of claim 3, comprising configuring the handover or the change of node operation by:
transmitting, from the wireless communication node, a fourth message to the second wireless communication node requesting a handover or a change of node operation from the wireless communication node to the second wireless communication node, wherein the fourth message includes information for configuring a first set of transmission grants according to a first time-domain multiplexing pattern;
receiving, at the wireless communication node, a fifth message from the second wireless communication node acknowledging the handover or the change of node operation, wherein the fifth message includes information for configuring a second set of transmission grants according to a second time-domain multiplexing pattern; and
determining, based on the first and second time-domain multiplexing patterns, a third set of transmission grants according to a third time-domain multiplex pattern.

6. A method for wireless communication, comprising:
transmitting, from a mobile device, a first message to a wireless communication node requesting a reestablishment of a network connection;
receiving, at the mobile device, a second message from the wireless communication node, the second message including information for reestablishing the network connection and information for reconfiguring the network connection, wherein the information for reconfiguring the network connection is carried in a protocol data unit packet produced by a Packet Data Convergence Protocol entity; and
in response to failing to complete a reconfiguration of the network connection by the mobile device, transmitting, from the mobile device, a third message to the wireless communication node indicating completing a reestablishment of the network connection,
wherein the first message, the second message, and the third message are transmitted as part of a contention-based protocol in an unlicensed spectrum.

7. The method of claim 6, wherein the information for reconfiguring the network connection is carried by an octet string included in the second message.

8. The method of claim 6, further comprising:
receiving, at the mobile device, a set of data packets from the wireless communication node over a first wireless link during a handover operation or a change of node operation;
receiving, at the mobile device, at least a subset of the set of data packets from a second wireless communication node over a second wireless link during the handover operation or the change of node; and
decoding the data packets based on the set of data packets from the wireless communication node and at least the subset set of data packets from the second wireless communication node.

9. The method of claim 8, further comprising:
performing duplication detection based on the set of data packets from the wireless communication node and the subset of the set of data packets from the second wireless communication node.

10. The method of claim 8, further comprising:
receiving, at the mobile device, information from the wireless communication node for determining when to initiate the handover operation or the change of node operation, wherein the information includes at least one of: a threshold value for a Received Strength Signal Indicator, or a threshold value for a Channel Occupancy.

11. An apparatus for wireless communication comprising a processor that is configured to:
receive a first message from a mobile device requesting a reestablishment of a network connection;
transmit a second message to the mobile device, the second message including information for reestablishing the network connection and information for reconfiguring the network connection, wherein the information for reconfiguring the network connection is carried in a protocol data unit packet produced by a Packet Data Convergence Protocol entity; and
receive a third message from the mobile device indicating completing a reestablishment of the network connection, wherein the third message is received in response to a failure to complete a reconfiguration of the network connection by the mobile device, and
wherein the first message, the second message, and the third message are transmitted as part of a contention-based protocol in an unlicensed spectrum.

12. The apparatus of claim 11, wherein the information for reconfiguring the network connection is carried by an octet string included in the second message.

13. The apparatus of claim 11, wherein the processor is configured to:
transmit, over a first transmission link, a set of data packets to the mobile device during a handover or a change of node operation; and
transmit, over a second transmission link, at least a subset of the set of data packets to a second wireless communication node during the handover or the change of node operation to cause the second wireless communication node to send at least the subset of the set of data packets to the mobile device over a third transmission link.

14. The apparatus of claim 13, wherein the subset of the set of data packets is duplicated by a packet data convergence protocol entity with a sequence number prior to a header compression of the subset of the set of data packets.

15. The apparatus of claim 13, wherein the processor is configured to configure the handover or the change of node operation by:
transmitting a fourth message to the second wireless communication node requesting a handover or a change of node operation to the second wireless communication node, wherein the fourth message includes information for configuring a first set of transmission grants according to a first time-domain multiplexing pattern;
receiving a fifth message from the second wireless communication node acknowledging the handover or the change of node operation, wherein the fifth message includes information for configuring a second set of transmission grants according to a second time-domain multiplexing pattern; and
determining, based on the first and second time-domain multiplexing patterns, a third set of transmission grants according to a third time-domain multiplex pattern.

16. An apparatus for wireless communication comprising a processor that is configured to:
transmit a first message to a wireless communication node requesting a reestablishment of a network connection;
receive a second message from the wireless communication node, the second message including information for reestablishing the network connection and information for reconfiguring the network connection, wherein the information for reconfiguring the network connection is carried in a protocol data unit packet produced by a Packet Data Convergence Protocol entity; and
in response to failing to complete a reconfiguration of the network connection bar the apparatus, transmit a third message to the wireless communication node indicating completing a reestablishment of the network connection,
wherein the first message, the second message, and the third message are transmitted as part of a contention-based protocol in an unlicensed spectrum.

17. The apparatus of claim 16, wherein the information for reconfiguring the network connection is carried by an octet string included in the second message.

18. The apparatus of claim 16, wherein the processor is configured to:
receive a set of data packets from the wireless communication node over a first wireless link during a handover operation or a change of node operation;

receive at least a subset of the set of data packets from a second wireless communication node over a second wireless link during the handover operation or the change of node; and decode the data packets based on the set of data packets from the wireless communication node and at least the subset set of data packets from the second wireless communication node.

19. The apparatus of claim 18, wherein the processor is configured to: perform duplication detection based on the set of data packets from the wireless communication node and the subset of the set of data packets from the second wireless communication node.

20. The apparatus of claim 18, wherein the processor is configured to: receive information from the wireless communication node for determining when to initiate the handover operation or the change of node operation, wherein the information includes at least one of: a threshold value for a Received Strength Signal Indicator, or a threshold value for a Channel Occupancy.

* * * * *